Aug. 22, 1939.  C. W. LATIMER ET AL  2,170,203
LONG DASH AND LIGHT KEYING INDICATOR
Filed Jan. 17, 1936  2 Sheets-Sheet 1
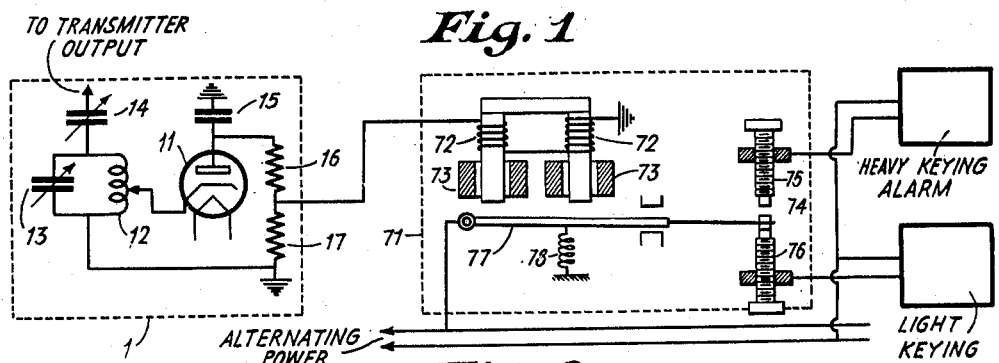
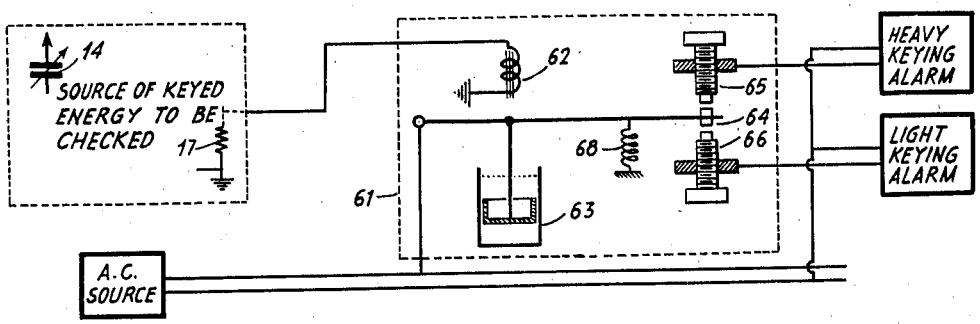
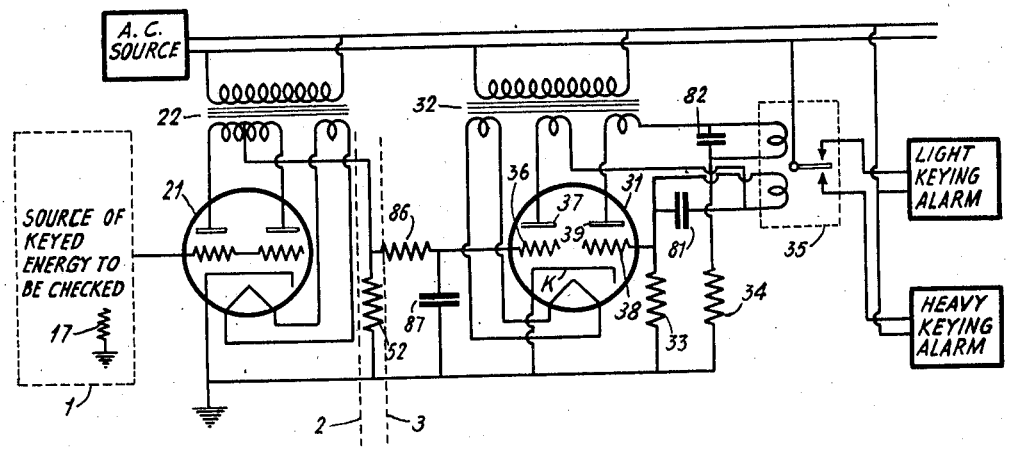
INVENTORS
JAMES W. CONKLIN — JAMES L. FINCH
HALLAN E. GOLDSTINE — C. W. LATIMER
BY
ATTORNEY Aug. 22, 1939.  C. W. LATIMER ET AL  2,170,203
LONG DASH AND LIGHT KEYING INDICATOR
Filed Jan. 17, 1936  2 Sheets-Sheet 2
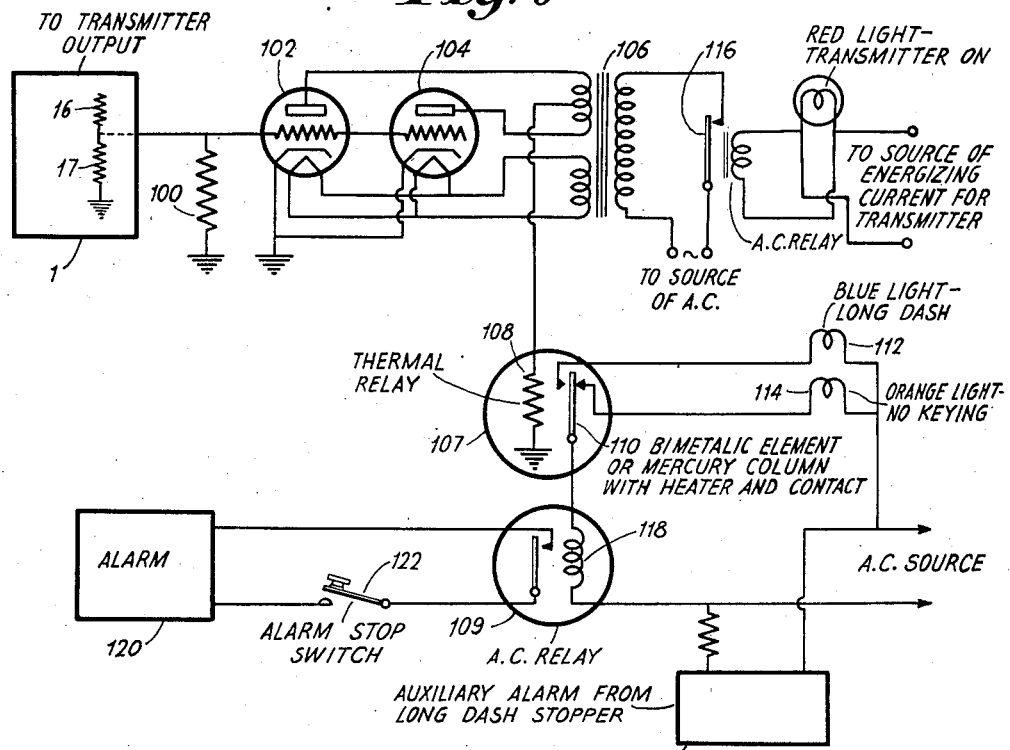
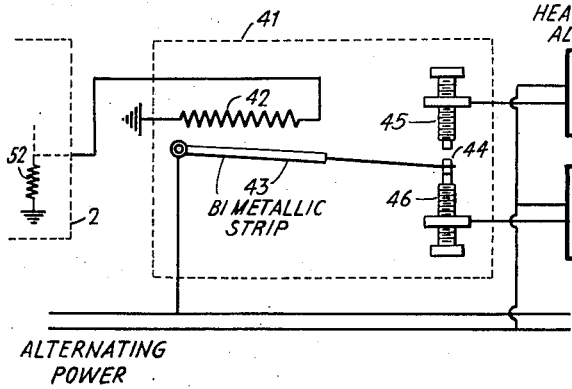
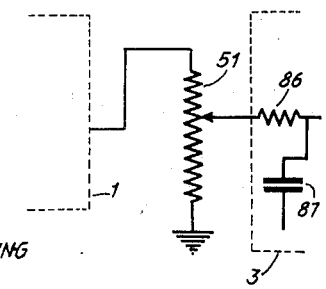
INVENTORS
JAMES W. CONKLIN — JAMES L. FINCH
HALLAN E. GOLDSTINE — C.W. LATIMER
BY
ATTORNEY Patented Aug. 22, 1939

2,170,203

UNITED STATES PATENT OFFICE 2,170,203

LONG DASH AND LIGHT KEYING INDICATOR

Chester W. Latimer, West Orange, N. J., and James L. Finch, Patchogue, James W. Conklin, Rocky Point, and Hallan Eugene Goldstine, Port Jefferson Station, N. Y., assignors to Radio Corporation of America, a corporation of Delaware Application January 17, 1936, Serial No. 59,542

10 Claims. (Cl. 178—69)

This application concerns a novel and simple means to be used with a keyed source of alternating current to analyze the manner in which said alternating current is keyed. The means may include an indicating device for producing indications of the nature of the key markings on the wave energy. The invention is particularly adapted to the indication of extra heavy or extra light marking bias according as it occurs in the keying of telegraph signals and to the indication of the presence of a continuous dash and the presence of continued marking.

The novel features of our invention will be described in detail in connection with the attached drawings, throughout which like reference characters indicate like parts insofar as possible, and in which:

Fig. 1 illustrates schematically the essential features of means for picking up keyed oscillatory energy, rectifying the same, and producing indications characteristic of the nature of said keyed energy; and Figs. 2, 3, 4, 5 and 6 are modifications of the arrangement of Fig. 1. The mechanical relay for controlling the indicators in accordance with the current intensity which is in turn characteristic of the nature of the keyed wave of Fig. 1, has been replaced by a relay of a different type in Fig. 2. The mechanical relays of Figs. 1 and 2 have been replaced by a thermionic relay in Fig. 3. Moreover, in Fig. 3, additional means for controlling the relay is interposed between the relay and the wave absorbing and rectifying means. The relays of the prior figures have been replaced in Fig. 4 by a thermal contact closing means in the form of a bimetallic strip, which is deformed in different manners under different temperatures in turn controlled by current intensity, to close indicating circuits or alarms.

In Fig. 5, a modified form of the circuit of Fig. 3 is shown. The circuit of Fig. 5 has some of the features of Fig. 1 and some of the features of the circuit of Fig. 3. In Fig. 6, we have shown a circuit of the type described in which the wave absorbing and rectifying means is connected with an oscillating rectifier, the output of which is coupled to a thermal relay in turn connected with the indicating circuits. In Fig. 6, we have also shown the manner in which the indicating system of the present invention cooperates with other circuits which form part of transmitters as used in practice to-day.

Turning to the drawings, and in particular to Fig. 1, 1 represents a transmitter monitor radio frequency pickup rectifier which we use in connection with many of our transmitters for monitoring purposes. The circuit consists of rectifier tube 11, and a tuned circuit using tapped inductor 12 and variable capacitor 13. This tuned circuit is coupled to the transmitter output through capacitance 14. The cathode of 11 is connected to the tap on 12 while the anode of 11 is grounded for radio frequency through bypass capacitor 15. The rectifier current flows through resistors 16 and 17 and through a portion of inductor 12. The output of this unit under the marking condition is approximately negative 15 volts while under the spacing condition it is zero. The output current actuates slow acting relay 71. This relay consists of armature coil 72, moving contact arm 74 and adjustable stationary contacts 75 and 76. The magnetic pole pieces are provided with copper rings 73 between the winding 72 and the moving element 77. The effect of 73 is to prevent sudden changes in the flux which tends to move 77. Accordingly, 74 assumes a position corresponding to the average percent of time that the marking character is on. Contacts 75 and 76 are normally adjusted so that under this condition 74 does not touch either of them. In case a steady marking signal is held or in case the average signals are heavy, 74 will touch 75 and actuate the heavy keying alarm. In case of continuous spacing or in case of light signals, 74 will touch 76 and actuate the light keying alarm.

Fig. 2 is similar to Fig. 1 except that relay 71 is replaced by relay 61. The operation of this relay is the same as 71 except that delay in relay response is obtained by a dashpot 63 instead of the special magnetic circuit.

In the circuits of Fig. 3, the time delay function is provided by an electrical circuit consisting of resistor 86 and capacitor 87. 1 is the same as in Fig. 1. Its output voltage is impressed on the grids of the double triode tube 21. When these grids are at zero potential, transformer 22 causes current to flow through the plate circuits. Rectification takes place, the rectified current pulses returning through resistor 52 in the common cathode return lead. The voltage thus set up across resistor 52 tends to charge capacitor 87 through resistor 86. The values of 86 and 87 are so chosen as to require a very appreciable time for 87 to become charged or discharged. This time is so long that individual keying characters make a very small difference in the voltage across 87. Under average keying conditions, the voltage across 87 reaches a particular average value. Should the keying characters become heavy or should a continuous marking character occur, the current will flow through 16, 17 for a greater percent of the time. This will cause a decrease in the percent of the time the voltage across 52 tends to charge 87, and the voltage across 87 will fall below this average value.

Conversely, in case of light signals or in case of a continuous spacing signal, the voltage across 87 will rise above this average value. The voltage across 87 is impressed on the first grid 36 of a second double triode 31. For average telegraph signals, the constants of the circuit are so arranged that the grid 36 will be biased to a potential about half way between zero and cutoff. Transformer 32 impresses an alternating voltage on the plate 37 of the first triode of 31. When this triode is conductive, current flows through resistor 33, through the lower armature coil of 35 and through plate 37, returning through the cathode K of this tube. This sets up a voltage across 33 which is impressed on grid 38 of the second triode of tube 31. The constants of the circuits are so chosen that this voltage under average keying conditions biases grid 38 to a potential midway between zero potential and cutoff. This allows current to flow through resistor 34, the upper armature winding of relay 35 and to the anode 39, returning through the cathode of 31 which may be grounded. The constants of these circuits are so chosen that the currents through the two armature coils of 35 are approximately equal under these conditions. Now, in case of extra heavy telegraph signals or in case of continuous marking characters, the potential of grid 36 runs above average and the current in the lower armature winding will increase. This also increases the current in 33 and the potential on 38 falls below average, and the current in the upper winding of 35 will decrease, causing the lower contacts of 35 to close and to actuate the heavy keying alarm. In an opposite but a similar manner, for light keying or continuous spacing characters, the light keying alarm will be actuated. In practice, each of the double triodes 21 and 31 may be replaced by two tubes of any type.

In Fig. 4, the circuits to the right of line 2 in Fig. 3 are replaced by the thermal relay 41. Those to the left of line 2 are the same in Fig. 4 as in Fig. 3. Thermal relay 41 consists of a bi-metallic member 43 and a heater 42. When heat is applied from 42 the bi-metallic member 43 moves contact 44 in proportion to the degree of temperature attained from 42. For average telegraph signals, the heat supplied by 42 is sufficient to deflect contact 44 by an average amount. Stationary adjustable contacts 45 and 46 are set so that neither of them are touching 44 under these conditions. Now, in case of heavy signals or in case of continuous marking signal, less heat is supplied, which causes 44 to touch 45 and to actuate the heavy keying alarm. In case of light signals or continuous marking characters, additional heat is supplied and contact 44 touches 46 and actuates the light keying alarm. The thermal delay in transferring heat from 42 to 43 in radiating heat from 43 to the air is such that individual signals do not appreciably effect the position of 44. The constants of this thermal circuit are arranged to give the time delay desired.

In Fig. 5, circuits of 1 are the same as in Fig. 1 and the circuits to the right of line 3 are the same as those to the right of line 3 of Fig. 3. Resistor 52 in Fig. 3 is replaced by potentiometer 51 in this figure. This potentiometer is so adjusted that for average telegraph signals the voltage across 87 will attain a value midway between that required for blocking the first triode of 31 and zero. The action of this circuit will be similar to that described under Fig. 3, except that heavy signals will now have the same effect that light signals had in that case and vice versa. It will be necessary to connect the heavy keying alarm to the upper contact of relay 35 and the light keying alarm to the lower contact of relay 35.

In the arrangement of Fig. 6, the output of the pickup rectifier in 1 is connected as shown with a resistance 100, the other terminal of which is connected to ground. The high potential side (negative) of the resistance 100 is connected to the control grids of the pair of thermionic tubes 102 and 104 which are connected in a self-rectifying circuit. The cathodes of the tubes which may be triodes are grounded as shown. The anodes of the tubes are connected in push-pull relation by a secondary winding of a transformer 106, the primary winding of which may be coupled to any source of alternating current voltage. The electrical center of a secondary winding of transformer 106 is connected by way of a thermal relay 107 to ground. The thermal relay heating element 108 cooperates with a contact closing element 110 arranged so that in one position it completes a circuit through a blue light which indicates the presence of long dashes on the keyed wave and in another position through an orange light to indicate the absence of keying on the wave, or to indicate light keying on the wave. Obviously, we contemplate the use of lights of different colors for indicating purposes or alarms of different character. The indicating circuits may include any source of potential, as, for example, an alternating current source connected in series with 110 and the lights 112 and 114. The operation of this indicator is similar in many respects to the operation of the indicators described hereinbefore and such operation will be understood without further detailed description thereof. It may be noted, however, that the impedance of 100 is such that zero potential is applied to the control grids of the tubes 102, 104 by the presence of spacing of the keyed wave pickup in 1, and becomes negative to a point at or beyond which the tubes 102 and 106 are cut off in the presence of marking on the wave pickup in 1.

The long dash indicators and light keying indicators of all the figures may cooperate with other elements and devices and circuits used in transmitters to-day. For example, the pickup device in 1 may be the monitoring receiver used for monitoring the transmitter. The operating potentials and currents may be derived from the transmitter circuits. Moreover, the alarm circuits of the present indicators may be tied up with the alarm circuits and operating circuits of the transmitter. As shown in Fig. 6, the alternating current source connected to the transformer 106 may be controlled by an alternating current relay 115 which is energized by alternating current from the transmitter on the closing of the transmitter plate supply switch (not shown) and operates to automatically close a contact 116 to energize the primary winding of 106. Moreover, the circuit completed by the armature or closing contact 110 may include the winding 118 of an alternating current relay 109 which in turn when energized closes an alarm 120 in the control room or at the transmitter. The alarm 120 may be turned off by an alarm stop-switch 122. The circuit including the armature 110 and the alternating current relay 108 may also be connected with an auxiliary device 115 at the transmitter, which prevents a long dash on the transmitter control circuit from causing the transmitter to radiate beyond a predetermined period, but which automatically permits resumption of normal keying of the transmitter following a momentary return to spacing current in the keying circuit. This device may also actuate the relay 109 to produce an alarm in the circuit 120.

In Figs. 1, 2 and 5, precise action depends upon a constant transmitter output voltage. In case the transmitter output voltage rises, this device will respond the same as if the telegraph signals became heavier. In some cases, this action may be desirable, while in other cases it may be undesirable. In the case of Figs. 3, 4 and 6, a limiting action is provided so that the transmitter output voltage can vary over a considerable range without having an appreciable effect upon the response of these devices to changes in signal weight.

What is claimed is:

1. In a system for indicating departures from a normal marking bias in the keying of telegraphic radio signals and the amplitude of keying of a keyed wave, keyed wave receiving, amplifying and rectifying means, a resistance connected with said rectifying means, a thermionic responsive means having input electrodes connected in shunt to a portion of said resistance, and having output circuits, a three-position relay connected with said output circuits, a plurality of indicators, and energizing circuits including contacts associated with said relay for operating each of said indicators.

2. In a system for indicating the rate of keying and amplitude of keying of a keyed wave, wave receiving, and rectifying means, resistive means connected with said rectifying means, capacitive means in parallel with said resistive means, the time constant of said resistive means and capacitive means being such that the condenser becomes charged only in the presence of normal keying of said wave, an electron discharge system having a plurality of control grids, cathode structure and a plurality of anodes, a connection between one of said control grids and the resistance connected with said rectifying means, a three-position relay having one winding in circuit with a resistance and with one of the anodes of said electron discharge system, a connection between the other control grid of said electron discharge system and said last named resistance, and a second relay winding connected with the other anode of said discharge system tube.

3. In a system for indicating the rate of keying and amplitude of keying of a keyed wave, wave rectifying means, resistive means connected with said rectifying means, a pair of discharge tubes each having a control grid, a cathode and an anode, a connection between the control grids of said tubes and said resistance, a heater element connected with the anodes of said tubes, a bi-metallic strip adjacent said heater element, and an alarm circuit connected with said bi-metallic strip.

4. In a system for indicating the presence of long dashes or light keying on a keyed wave, wave absorbing and rectifying means, a pair of discharge devices each having a control grid, a cathode and an anode, resistive means coupling said first named rectifier to the control grids and cathodes of said devices, a source of alternating current coupled to the anodes of said devices, a thermal element coupling the anodes of said devices to the cathodes of said devices, a metallic strip mounted adjacent said thermal element, indicator circuits each including energizing means and said metallic strip, and a contact in each of said indicator circuits located adjacent said metallic strip.

5. In a system for indicating the ratio of marking to spacing on a keyed wave, a rectifier having input electrodes energized by said wave, a resistance connected to the output of said rectifier, a pair of tube systems each having a control grid, an anode and a common cathode, a circuit connecting the control grids and cathode of said tube systems to said resistance, a source of alternating current coupled to the anodes of said tube systems, a resistance and a condenser connected between the anodes and cathode of said tube systems, an electron discharge system having a pair of grid electrodes, a pair of anode electrodes and a cathode, a circuit coupling one of said grid electrodes of said last named system to said last named resistance, a third resistance connecting one of said anodes to the other of said grid electrodes, and a relay connected to each of said anodes of said last named system.

6. A system for monitoring keyed radio signals, and for giving effect to variations in their marking bias according to whether said bias is normal, "heavy", or "light", said system comprising means for receiving, amplifying and rectifying said signals, electronic responsive means on which rectified signaling energy is impressed by the first said means, a three-position relay under control of the electronic responsive means, said relay being adapted to assume a neutral position during normal characterization of the keyed signals, and being adapted to assume a particular one of the remaining positions in dependence upon the "heavy" or "light" characterization of the keyed signals, and separate indicating means under control of said relay for evidencing the occurrence of "heavy" and "light" marking bias respectively.

7. A monitoring system in accordance with claim 6 and having included in said electronic responsive means a double triode discharge tube arrangement having two output circuits, and being further characterized in that said three-position relay possesses two separate windings, one in each output circuit of said discharge tube arrangement.

8. A system in accordance with claim 6 and having a resistor in an output circuit for the rectifying portion of the first said means and further characterized in that said electronic responsive means is caused to act in dependence upon the value of the potential drop in said resistor.

9. A system in accordance with claim 6 and further characterized in that said three-position relay is thermally responsive and possesses a bi-metallic member having a contact normally held intermediate between two cooperating stationary contacts and selectively engageable with said stationary contacts according as a heavy or light marking bias is to be indicated.

10. A system in accordance with claim 6 and further characterized in that the electronic responsive means comprises the equivalent of a pair of triode discharge tubes powered by a source of alternating current and said three-position relay is of the thermally responsive type.

CHESTER W. LATIMER.
JAMES L. FINCH.
JAMES W. CONKLIN.
HALLAN EUGENE GOLDSTINE.